United States Patent
Almkvist et al.

(10) Patent No.: US 9,890,696 B2
(45) Date of Patent: Feb. 13, 2018

(54) HIGH AND LOW PRESSURE TURBOCHARGER SYSTEM WITH COMPRESSED GAS TANK

(71) Applicant: VOLVO CAR CORPORATION, Gothenburg (SE)

(72) Inventors: Goran Almkvist, Lerum (SE); Jonas J. Bjorkholtz, Karna (SE)

(73) Assignee: VOLVO CAR CORPORATION (SE)

( * ) Notice: Subject to any disclaimer, the term of this patent is extended or adjusted under 35 U.S.C. 154(b) by 490 days.

(21) Appl. No.: 14/535,720

(22) Filed: Nov. 7, 2014

(65) Prior Publication Data
US 2015/0139777 A1 May 21, 2015

(30) Foreign Application Priority Data
Nov. 15, 2013 (EP) .................................. 13193094

(51) Int. Cl.
| | |
|---|---|
| F02B 37/013 | (2006.01) |
| F02B 37/12 | (2006.01) |
| F02D 41/00 | (2006.01) |
| F02B 37/18 | (2006.01) |
| F02B 37/16 | (2006.01) |
| F02B 37/14 | (2006.01) |
| F02B 21/00 | (2006.01) |
| F02B 37/20 | (2006.01) |
| F02B 37/00 | (2006.01) |
| F02B 37/10 | (2006.01) |

(52) U.S. Cl.
CPC ............ *F02B 37/013* (2013.01); *F02B 21/00* (2013.01); *F02B 37/004* (2013.01); *F02B 37/10* (2013.01); *F02B 37/127* (2013.01); *F02B 37/14* (2013.01); *F02B 37/16* (2013.01); *F02B 37/18* (2013.01); *F02B 37/20* (2013.01); *F02D 41/0007* (2013.01); *F02B 2037/162* (2013.01); *Y02T 10/144* (2013.01)

(58) Field of Classification Search
CPC ...... F02B 21/00; F02B 37/004; F02B 37/013; F02B 37/10
See application file for complete search history.

(56) References Cited

U.S. PATENT DOCUMENTS

| | | | |
|---|---|---|---|
| 5,408,979 A | 4/1995 | Backlund et al. | |
| 8,635,869 B2 * | 1/2014 | An | F02B 37/004 60/600 |

(Continued)

FOREIGN PATENT DOCUMENTS

| | | |
|---|---|---|
| EP | 1905988 A2 | 4/2008 |
| EP | 2058485 A1 | 5/2009 |
| GB | 2121474 A | 12/1983 |

OTHER PUBLICATIONS

Extended European Search Report dated Apr. 11, 2014, Application No. 13193094.3-1606, Applicant Volvo Car Corporation, 5 Pages.

*Primary Examiner* — Mary A Davis
(74) *Attorney, Agent, or Firm* — Brooks Kushman P.C.

(57) ABSTRACT

A turbocharger system and method for a vehicle, wherein the system comprises a high pressure turbocharger and a low pressure turbocharger. Both the high and low pressure turbochargers are driven by exhaust gas on an exhaust side of the turbochargers. The system further comprises a first bypass conduit that bypasses the low pressure turbocharger during set events.

11 Claims, 3 Drawing Sheets

(56) References Cited

U.S. PATENT DOCUMENTS

2009/0038309 A1* 2/2009 Cocca ............... F02B 37/013
    60/603
2013/0306039 A1* 11/2013 Zagone ............. F02B 37/004
    123/562

* cited by examiner

HIGH AND LOW PRESSURE TURBOCHARGER SYSTEM WITH COMPRESSED GAS TANK

CROSS-REFERENCE TO RELATED APPLICATIONS

This application claims foreign priority benefits under 35 U.S.C. § 119(a)-(d) to European patent application number EP 13193094.3, filed Nov. 15, 2013, which is incorporated by reference in its entirety.

TECHNICAL FIELD

The device and/or method relates to a turbocharger system and method for a vehicle. The turbocharger system comprises a high pressure turbocharger and a low pressure turbocharger. Both the high and low pressure turbochargers are driven by exhaust gas on an exhaust side of the turbochargers. Both the high and low pressure turbochargers are arranged to compress air on an air intake side of the turbochargers when exhaust gas drives the turbochargers. The high pressure turbocharger is positioned upstream the low pressure turbocharger with reference to the exhaust gas flow and downstream the low pressure turbocharger with reference to the air flow. The system comprises a first pipe system connecting the low pressure turbocharger to the high pressure turborcharger for fluid communication between them on the air intake side and a second pipe system connecting the high pressure turbocharger to the low pressure turbocharger for fluid communication between them on the exhaust gas side. The first pipe system comprises a first conduit connected to an inlet of the low pressure turbocharger and to inlet air. The first pipe system comprises a second conduit connecting an outlet of the low pressure turbocharger to an inlet of the of the high pressure turbocharger.

BACKGROUND

In vehicles of today it is common to use an exhaust driven turbocharger for compressing air to an inlet manifold of an engine. The turbocharger revs up dependent on the exhaust flow, which in turn is dependent on engine speed and engine torque. Hence, turbocharger response is a well-known problem with turbocharger engines at low engine speeds. This problem becomes worse with the new technologies to reduce $CO_2$, downspeeding and downsizing with increased boost due to the fact that it needs more energy to build up the higher boost pressure. The response problem is a limiting factor in $CO_2$ reduction especially in real world driving due to that an acceptable drivability of the vehicle needs an amount of power margin to handle instant power demands without need of gear shifting, The instant power demands may be from road inclination, small accelerations, accessories, etc. In order to use as much of the energy from the exhaust gas as possible, it is known to use two turbochargers in series, one high pressure turbocharger that compresses the inlet air before the inlet manifold but also a low pressure turbocharger that compresses air before entering the high pressure turbocharger. The response problem according to the above is known also for a two-step system, but an additional problem is the synchronization of the two turbochargers in order to utilize them in optimal way depending on engine load.

It is known to use various compressors connected to the inlet manifold for response assistance by feeding air to the inlet side before the turbocharger has revved up. The mechanical compressor is complex, expensive, has low durability, NVH (Noise, Vibrations, Harshness) problems, difficult to control and is noisy.

There is thus a need to find a solution that is cost efficient, durable, produces low noise and improved response.

SUMMARY

A problem to be solved is to find an optimum utilization of a two-step turbocharger system for a vehicle.

The turbocharger system comprises a high pressure turbocharger and a low pressure turbocharger. Both the high and low pressure turbochargers are driven by exhaust gas on an exhaust side of the turbochargers. Both the high and low pressure turbochargers are arranged to compress air on an air intake side of the turbochargers when exhaust gas drives the turbochargers. The high pressure turbocharger is positioned upstream the low pressure turbocharger with reference the exhaust gas flow and downstream the low pressure turbocharger with reference to the air flow. The system comprises a first pipe system connecting the low pressure turbocharger to the high pressure turborcharger for fluid communication between them on the air intake side and a second pipe system connecting the high pressure turbocharger to the low pressure turbocharger for fluid communication between them on the exhaust gas side. The first pipe system comprises a first conduit connected to an inlet of the low pressure turbocharger and to inlet air. The first pipe system comprises a second conduit connecting an outlet of the low pressure turbocharger to an inlet of the of the high pressure turbocharger. The first pipe system comprises a first bypass conduit connected to the second conduit on one end and essentially directly to ambient air on the other end. The first pipe system also comprises a first valve positioned in the first bypass conduit for controlling air flow from ambient air to the second conduit for removing underpressure in the second conduit compared to the first conduit.

It should be noted that "essentially directly to ambient air" means that no or very little pressure loss is experienced in the conduit connected to the ambient air.

Here, "underpressure" means that the pressure in the second conduit is lower than the pressure in the first conduit.

The first pipe system may comprise an inlet pipe system connected to the first conduit or comprising the first conduit. The inlet pipe system may have very small losses, i.e., may be essentially directly connected to ambient air, or the first conduit may be connected to an air pipe that could bypass the inlet pipe system such that the first conduit becomes connected essentially directly to ambient air for maximum air flow in the first conduit. The air flow could be controlled by a valve in the first conduit or the inlet pipe system or the air pipe.

One advantage of the arrangement and method is that the second conduit is connected to an air source, ambient air, which removes any underpressure that would hinder the revving up of the high pressure turbocharger during certain engine driving modes. If the first bypass conduit is connects the first conduit and second conduit, the opening of the first valve equalizes the pressure in the first conduit and the second conduit for maximum air flow in the second conduit.

When the engine goes from low engine load to high and the exhaust gas flow increases the high pressure turbocharger revs up and the inlet air compresses accordingly. The exhaust gas exiting the high pressure turbocharger then enters the low pressure turbocharger, but in some cases, for example during revving of the engine, the low pressure turbocharger does not respond as quick as the high pressure turbocharger. One benefit of having the possibility to bypass the low pressure turbocharger occurs during such events since the late response of the low pressure turbocharger compared to the high pressure turbocharger would otherwise create an underpressure, i.e. lower pressure, in the second conduit compared to ambient air and/or the first conduit, which in turn means that the high pressure turbocharger actually drives the revving up of the turbocharger on the inlet air side due to suction. This in turn has a negative effect on the response of the high pressure turbocharger. The underpressure between the second conduit and the ambient air and/or the first conduit may be eliminated by bypassing the low pressure turbocharger so that the inlet to the high pressure turbocharger becomes connected essentially directly to ambient air or a system that supplies air to the inlet without said limitations on the air supply. However, pipe dimensions etc. also creates a loss so there will always be limitations of air supply, but with the same pipe dimension the bypassing of the low pressure turbocharger when underpressure is created or anticipated will lower the overall loss in the first pipe system and thus give the high pressure turbocharger and thereby the engine a better response.

The first bypass conduit may be connected on one end to the second conduit and on the other end essentially directly to ambient air. As an alternative, the first bypass conduit may be connected on one end to the second conduit and on the other end to a different pipe or pipe system connected essentially directly to ambient air. As yet an alternative, the first bypass conduit may be connected on one end to the second conduit and on the other end connected to the first conduit. Normally the pipe system used for inlet air comprises filters and other devices that may condition the air, for example, heaters and/or coolers. It should be noted that the pipe system for inlet air to the low pressure turbocharger normally is connected essentially directly to ambient air and that the pressure in the first conduit is essentially the same as the pressure of the ambient air. However, due to known physical limitations depending on, for example, pipe dimension, filters, bends, etc., the pipe system and thus the first conduit may have a pressure slightly lower than ambient air. For other reasons, for example heating of the air in the pipe system, the air in the first conduit could have a slight overpressure compared to ambient air. If the pressure in the first conduit is essentially similar to ambient air, the examples of connecting the first bypass conduit essentially directly to ambient air is possible since it relieves the pressure difference between the second conduit and the first conduit. However, should the pressure in the first conduit differ essentially from ambient air, the first conduit could be connected essentially directly to ambient air via a bypass system bypassing the inlet pipe system as described above.

According to one example, the first valve is a passive valve that opens when an underpressure is present in the second conduit. The first valve then closes the first bypass conduit when the low pressure turbocharger is synchronized with the high pressure turbocharger, i.e., has revved up to a speed that eliminates the underpressure so the high pressure turbocharger is provided sufficient amount of air. For example, when the engine has reached a new status quo, the second turbocharger provides overpressure in the second conduit and then helps the high pressure turbocharger charging the inlet air. There are many engine modes where the low pressure turbocharger creates an overpressure and there are some engine modes where the low pressure turbocharger does not respond as quickly as the high pressure turbocharger and then creates an underpressure. All cases will not be presented in the specification, but it should be pointed out that an advantage of using a passive first valve is that such a valve will automatically create a bypass of the low pressure turbocharger when there is an underpressure.

According to one example, the turbocharger system comprises a control unit and the first valve is an active valve controlled by the control unit. The control unit is arranged to open the valve when an underpressure is present or anticipated in the second conduit. Here, the control unit may comprise information on specific engine modes where underpressure is present or anticipated in the second conduit. The information may be based on empiric information connected to a certain engine parameter. The information may be based on calculations made from certain engine parameters. The information may be based on information from one or more sensors in the engine or devices connected to the engine, for example, throttle, gas pedal position, rotational speed of one or both of the turbochargers, etc. One advantage of using an active valve is that the response becomes even quicker since underpressure in the second conduit can be avoided entirely since the valve does not have to be activated due to an underpressure, as with the passive valve. The first pipe system may comprise a sensor for sensing the underpressure, and the sensor may be connected to the control unit for supply of information.

The first valve could be set to open at a predetermined value when the pressure in the second conduit is lower than the pressure in the first conduit. The predetermined value could be at least 1 kPa, at least 3 kPa and at least 5 kPa lower in the second conduit compared to the first conduit.

According to one example, the first pipe system comprises an air inlet pipe conduit connecting an outlet of the high pressure turbocharger and an intake manifold of an engine on the air intake side. The first pipe system comprises a second bypass conduit connecting the second pipe to the air intake manifold. The first pipe system comprises a second valve positioned in the second bypass conduit for controlling air flow from the second conduit to the air inlet pipe. The second valve could be an active valve coupled to a sensor for rotational speed and arranged to open when the high pressure turbocharger has reached an upper limit on rotational speed being measured by the sensor. The second valve could also be arranged to open when the pressure in the second conduit is higher than in the pressure in the inlet pipe conduit after the high pressure turbo charger. The pressure could be measured by the sensor. The second valve could also be a passive valve arranged to automatically open when the pressure in the second conduit is higher than in the pressure in the inlet pipe conduit after the high pressure turbo charger.

According to one example, the second pipe system comprises an exhaust gas manifold conduit connecting an exhaust gas manifold of an engine with an inlet of the high pressure turbocharger. The second pipe system comprises a third conduit connecting the outlet of the high pressure turbocharger with the inlet of the low pressure turbocharger. The second pipe system comprises a third bypass conduit connecting the exhaust gas manifold conduit to the third conduit. The second pipe system comprises a third valve for controlling exhaust gas flow between the exhaust gas manifold conduit and the third conduit. The third valve is arranged to open when the high pressure turbocharger has reached an upper limit on rotational speed or whenever to improve the efficiency of the turbocharger system.

Should the second and third valves both be active valves they could be controlled by a common control unit or each by a separate control unit. Since both the second and third valve affects the high pressure turbocharger, the control unit may control the valves for different purposes. For example, the upper limit of rotational speed may be different on the air intake side and the exhaust gas side. Furthermore, opening the second valve on the air intake side but having the third valve closed on the exhaust side would allow for the high pressure turbocharger to rev up without creating any pressure in the air inlet pipe conduit. However, if the first valve then would be closed underpressure would be created in the second pipe and the low pressure turbocharger would rev up faster. Opening the third valve and opening the second valve would give that the low pressure turbocharger would rev up quickly since the high pressure turbocharger would be bypassed on the exhaust side and the air intake side. Should the second valve be closed, the low pressure turbocharger would create an overpressure in the second conduit which would drive the high pressure turbocharger from the inlet air side. Should the first valve then be open, then air in the second conduit would instead either be recirculated to the inlet of the low pressure turbocharger or expelled out from the system. Having the second and third valves closed and the first valve open during reving up the engine and thus increased exhaust gas flow, would result in a quick response on the high pressure turbocharger since the low pressure turbocharger would be bypassed and no underpressure created over the low pressure turbocharger. Should the pressure in the air inlet pipe conduit have a higher pressure than in the second conduit the second valve could be opened and also the first and/or third valve could be opened in order not to hinder the air flow. The examples show how the three valves, regardless of being passive valves with no control unit or active valves, can be used in order to change behaviour of the turbocharger system and a combination of said examples and other combinations of opening and closing of the valves give a multitude of opportunities for controlling the turbocharger system and ultimately the behaviour of the engine.

Furthermore, for all examples the turbocharger system may also comprise a fourth bypass conduit bypassing the low pressure turbocharger on the exhaust gas side. An additional valve could be connected to the fourth bypass valve and the valve could be a passive or active valve connected to a control unit, similar to the first second or third valves. The fourth valve could be opened and closed in combination with the other valves in order to find the optimum usage of the system depending on the engine mode.

According to one example, the high pressure turbocharger response with initial compressor spin up may be increased by pushing compressed gases from a tank into the exhaust gas manifold or the exhaust gas manifold conduit connected to the exhaust gas manifold and the high pressure turbocharger. The exhaust gas manifold may be connected to the exhaust gas manifold conduit or the exhaust gas manifold conduit may be a part of the exhaust gas manifold. The gas is pushed as a pulse during a time period being approximately 0.1-0.2 s dependent on a number of factors such as, for example, turbocharger size, pressure of the pulse, engine size of gas conduits and other factors that will be exemplified below. Both the power of the pulse and the time interval may vary dependent on desired engine and turbocharger behavior. Hence, the time period may be shorter than 0.1 s and longer than 0.2 s.

It is the power of the pulse that is crucial for the response, not the energy. According to one example 12 kW is added during 0.1 s to the exhaust manifold. This spins up the turbo typically during 0.1 s and after 0.2 s the engine produces all turbo energy. Recharge time for the tank is needed for full effect, but improved response is always available even if the tank is not fully loaded. The reason is that the turbo always spins up if the tank pressure is high enough to create a pulse that generates an increase in pressure in the exhaust manifold.

Combining the pulse with opening of the first valve to avoid underpressure in the second conduit would benefit the response.

A further advantage with the example is that it is possible to implement on any existing turbocharger system, by simply adding the tank system to the exhaust manifold or conduit.

The tank may be refilled by using a small compressor that may be driven by electricity or any other suitable means. Alternative refilling of the tank is possible, for example use of exhaust gas. The exhaust gas may be used to drive a compressor or may itself be the gas to be used in the tank. The use of exhaust gas for loading may be allocated to time periods during blowdown peaks. One option is to use a valve, preferably a reed valve that is controlled to open during blowdown peaks to at least partly fill the tank. Such a solution could charge the tank with approximately 1 bar higher than the average exhaust manifold back pressure. The valve could also be controlled to close when the pressure in the tank exceeds the exhaust gas counter pressure from the engine, typically in the region about 1-3 bar.

The recharge of the tank may be done by recapturing the initial exhaust manifold backpressure build up during a predetermined time, typically 0.5-2 sec. depending of the exhaust back pressure build up.

The opening time of the tank valve should also be optimized on several parameters, for example:

Reducing exhaust contamination of valve and tank;
Allocate possible opening when back pressure is higher than tank pressure;
Increase system voltage to improve recharge time;
Controlling the amount of turbo speed up by partly emptying the tank; and
History to detect non steady state conditions such as higher turbo speed caused by a recently acceleration.

Furthermore, it is an alternative to use the high pressure in the inlet system or the exhaust manifold to at least partly refill the tank.

When introducing the compressed gas into the exhaust manifold or exhaust conduit, there is on a 4 cylinder engine always at least one exhaust valve open to one cylinder. The introduction of compressed gas affects the cylinder(s) associated with the open valve such that the engine revs up less than compared to if no gas would have been introduced. At the same time the introduction of gas revs up the high pressure turbocharger. Should the compressed gas be cold air, the introduction of cold gas into the cylinder(s) would expand due to the heat in the engine which would further increase the pressure in the exhaust manifold and the exhaust conduit such that the high pressure turbocharger revs up even more than if the gas would have been hot.

The system comprises a tank valve connected to the tank for controlling the gas flow from the tank. The tank valve may be operated by an electrical, hydraulic or mechanical regulating means for opening and closing the valve. The tank valve may also be arranged to control the flow of gas to the tank, but as an alternative a second valve or opening could be connected to the tank for controlling the flow of gas to the tank. The system also comprises a control unit for controlling the tank valve. The control unit may be connected to a pulse regulation unit for regulating the pulse duration time period.

Parameters that may control the tank valve:

For example, throttle movement and/or throttle position.

For example, turbocharger RPM, wherein the tank valve opening is closed when the high pressure turbocharger has an RPM (Rotation Per Minute) above a predetermine threshold. It is not necessary to measure RPM, but any substitute for evaluating the rotational speed could be used. Ambient conditions, road friction, vehicle speed, actual gear selected or shifting mode may be used to control the tank valve.

It may also be possible to inhibit or delay the pulse at parking maneuvers and gear shift.

The device and/or method are especially beneficial during take-off starts, i.e., when the vehicle is standing still or moving at low engine speeds and the driver makes a fast press down of the accelerator pedal indicating a wish to have a fast acceleration, and the high pressure turbocharger has not revved up enough to the give the engine the necessary air load to the inlet to create a turbo boost.

The device and/or method improve the take-off in such a way that it may be comparable to a scenario with stalling start, i.e., when car stands still and the driver breaks and at the same time puts the gas on, so that the engine and high pressure turbocharger revs up before the take-off.

The system comprises a tank pipe connected between the tank valve and the exhaust manifold or exhaust conduit. The volume and pressure of the tank contra diameter and length of the pipe are essential design parameters since the volume and pressure gives the energy and the pipe diameter acts as a choke for increasing or decreasing the possible amount of gas to be exerted during the pulse for a given volume and pressure.

A large turbocharger is an essential design parameter when downsizing an engine because a large turbocharger can produce more air flow and thereby gives a higher peak power of the engine. However, a large turbocharger has an increased problem with response compared to a smaller turbocharger, but with the device and/or method the larger turbocharger revs up well before the engines enthalpy has revved up the turbo. Hence, the device and/or method gives the advantage of eliminating the response problem with large turbochargers with high load pressure which in turn allows for downsizing engines, i.e., making the engine smaller and which in turn gives less fuel consumption.

The device and/or method is highly advantageous at high altitude where the ambient air has a low pressure which gives a small amount of exhaust gas enthalpy which in turn inhibits the possibility for the turbocharger to rev up. With the present device and/or method the introduction of compressed air to the exhaust manifold or exhaust conduit revs up the high pressure turbocharger which in turn compresses the ambient air to the engine which in turn is revved up in such a way that it produces exhaust gas to drive the high pressure turbocharger which has the benefit that the rev up may be comparable to that at low altitudes.

Furthermore, due to the quick response of the high pressure turbocharger it is possible to change gear shift schedule for down speeding, i.e., lower engine RPM but higher instant momentum is available which is an effect of faster rev up to high load pressure. The advantage is less ware and friction and thus less fuel consumption. The lower engine speed also emits lower noise increasing the interior and exterior comfort.

Another advantage of the device and/or method is the quick response during start and stop, where the shut off engine needs extra long time to rev up due to lower enthalpy caused by lower the engine speed and colder exhaust system during start phase The device and/or method will rev up the turbo similar to as if the engine was in idling mode.

Since the tank needs some time to be recharged there will be different rev up effects if a repeated acceleration is performed within the recharge time. After an acceleration using the device and/or method, when the tank was fully or partly emptied, the high pressure turbocharger revs up and due to the mass momentum of the spinning compressor in the high pressure turbocharger the compressor will continue to spin with high RPM during several seconds. The high RPM of the high pressure turbocharger is beneficial during next start, and dependent on set valve tank parameters the opening of the tank valve may be inhibited should the high pressure turbocharger already spin with a speed above the predetermined threshold value. As an alternative to measuring the high pressure turbocharger rotational speed, it is possible to calculate high pressure turbocharger rotational speed after an initial pulse deceleration to determine pulse duration.

Cold start: It is possible to use the device and/or method during cranking as soon as the engine or parts of the engine have fired. By introducing the compressed gas into the exhaust manifold or exhaust conduit, the high pressure turbocharger revs up and pushes compressed air fuel to the cylinders such that the known problem of low torque with low RPM during cold weather is avoided.

The device and/or method is possible to use on all vehicles independent on fuel choice, but when driving on gasoline and introducing air into the exhaust manifold or exhaust conduit it is advantageous to drive the engine below lambda 1 during a short period before, during and after the pulse. The reason is to compensate for the fact that oxygen may enter into the catalyst via the exhaust manifold or exhaust conduit, which may damage the catalyst function if too much oxygen is introduced to the catalyst.

According to one example it is possible to use the compressor and the tank in the air suspension system as a gas tank. In a normal car of medium size today, today a tank may hold 6 liters and 13 bar. The tank valve then is connected to the tank either directly or via a conduit.

Should the compressor and tank be separate units for the introduction of air into the exhaust manifold or exhaust conduit, other unit could be removed or eliminated in the design, for example, the tire compressor can be eliminated for a spare.

A minor fuel consumption penalty exists from recharging. As an example, if recharge occurs once every 2.5 km the penalty is around approx. 0.3% if the extra load is added to the engine.

The tank may be a Fire extinguisher type preferably made from stain resistive steel or aluminum. A tank drainage outlet is advantageously positioned at the bottom of the tank in order to drain water.

Charging of the tank by a small compressor typically 300 W:

The compressor could be placed in an engine compartment "cold zone" or in an air intake system for cooling. Typical recharge time may be 50% after 10 seconds and 90% after 25 seconds. The tank may be recharged by use of air from air filter or interior cabin for clean air.

The tank valve may be of a fast on/off type which is electrically controlled, or fast and slow in series or parallel to control pulse, or a combination with pneumatic chassis suspension, compressor and charge tank, or air pressure for brake system.

The system may comprise a check valve connected to the tank in order to assure that a pressure above a set value is released as a precaution.

The tank valve is connected to the exhaust manifold or exhaust conduit with a pipe of typically 15 mm diameter and which pipe is positioned upstream the high pressure turbocharger with reference to the exhaust gas flow direction. The exhaust gas flow direction is in a direction from the engine to the high pressure turbocharger.

The regulating means is controlled by the control unit typical tank release time is 0.1-0.2 sec. Control of engine power is done by the pressure pulse which is a function of valve opening duration time typically on/off with 50 ms steps.

Tank valve opening duration may be a function of one or more of pedal-position, -derivative, engine load and speed, coolant temp, vehicle speed, gear, ambient temperature, altitude, gear shift, accessories on/off, condition in pressure tank.

Furthermore, the control function may also be a function of GPS position, driver behavior, etc.

The condition in the tank, such as change by heat up, cold/hot start, state of charge, etc., may be detected by direct or indirect by using sensors such as pressure, temperatures. It may be possible to replace pressure gauge, temp sensor and safety valves with software functions.

If emission control is needed it is possible to compare the supplied oxygen during the pulse with the catalyst oxygen buffer, enriching air/fuel mix before and during pulse to restore catalyst buffer.

It may also be possible to enrich the air/fuel mixture to handle initial knock on petrol engine and smoke limiter control to improve torque/emission control on diesel engines.

Diagnosis to detect fault or leakage I pulse system may be performed by adding or using existing sensors such as inlet pressures, temperature and lambda sensors Safety: 1 L at 15 bar contains approximately 2 kJ energy which corresponds to 0.7 g gun powder (3 kJ/g) which is comparable to a small fireworks banger.

According to one example, the following parameters are valid:
Compressed Air Pressure in the tank 6-10 bar,
Tank volume: 1-2 L
12V Compressor around 200-400 W
Pulse duration: 0.1-0.2 sec
Dump valve/pipe diameter 10-15 mm
Dump valve control: electric valve controlled by a control unit
Typical response are 0.4 bar boost pressure within 0.4 sec
Recharge control by using the increasing back pressure to initial fill recharge time typically 10-20 s.

According to another example aiming to a more powerful response but a longer recharge time the following parameters are valid:
Compressed Air Pressure in the tank 10-15 bar,
Tank volume: 4-6 L
12V Compressor around 400-600 W
Pulse Duration: 0.1-0.3 sec
Dump valve/pipe diameter 15-25 mm
Dump valve control: electric valve controlled by a control unit
Typical response are 1.4 bar boost pressure within 0.4 sec
Recharge control by using the increasing back pressure to initial fill recharge time typical 30-60 s.

Yet another example:
2.0 L 5 cylinders Diesel engine a 2.3 L tank with 7.5 bar air pressure, and a 400 W electric compressor.
80% of the air tank is released during 0.1 s, the turbo speed increases 100000 rpm in 0.2 s.
Boost pressure is 0.5 bar after 0.3 s and the vehicle acceleration after 0.5 s is over 5 m/s2.
Wheel spin occurs after 0.6 s.

The device and/or method makes a very good combination with a torque converter allowing the engine to reach speeds with max torque available.

The tank valve may be arranged to be controlled in such a way that only a part of the pressure is released from the tank during one or more pulsations. The benefit is that the engine response can be controlled with the pulse(s). During the release, the tank valve is arranged to perform one or more opening events, i.e., one or more pulsations. The pulsations correspond to the tank valve opening time and it has proven advantageously that at least one opening time is longer than 50 ms in order to protect the on/off controlling.

The tank valve may also be controlled in such a way that only a part of the pressure is released. The tank valve may be arranged to open only a part of max open area in order to control the engine response with the valve opening area.

BRIEF DESCRIPTION OF THE DRAWINGS

The device and/or method will below be described in connection with the below drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
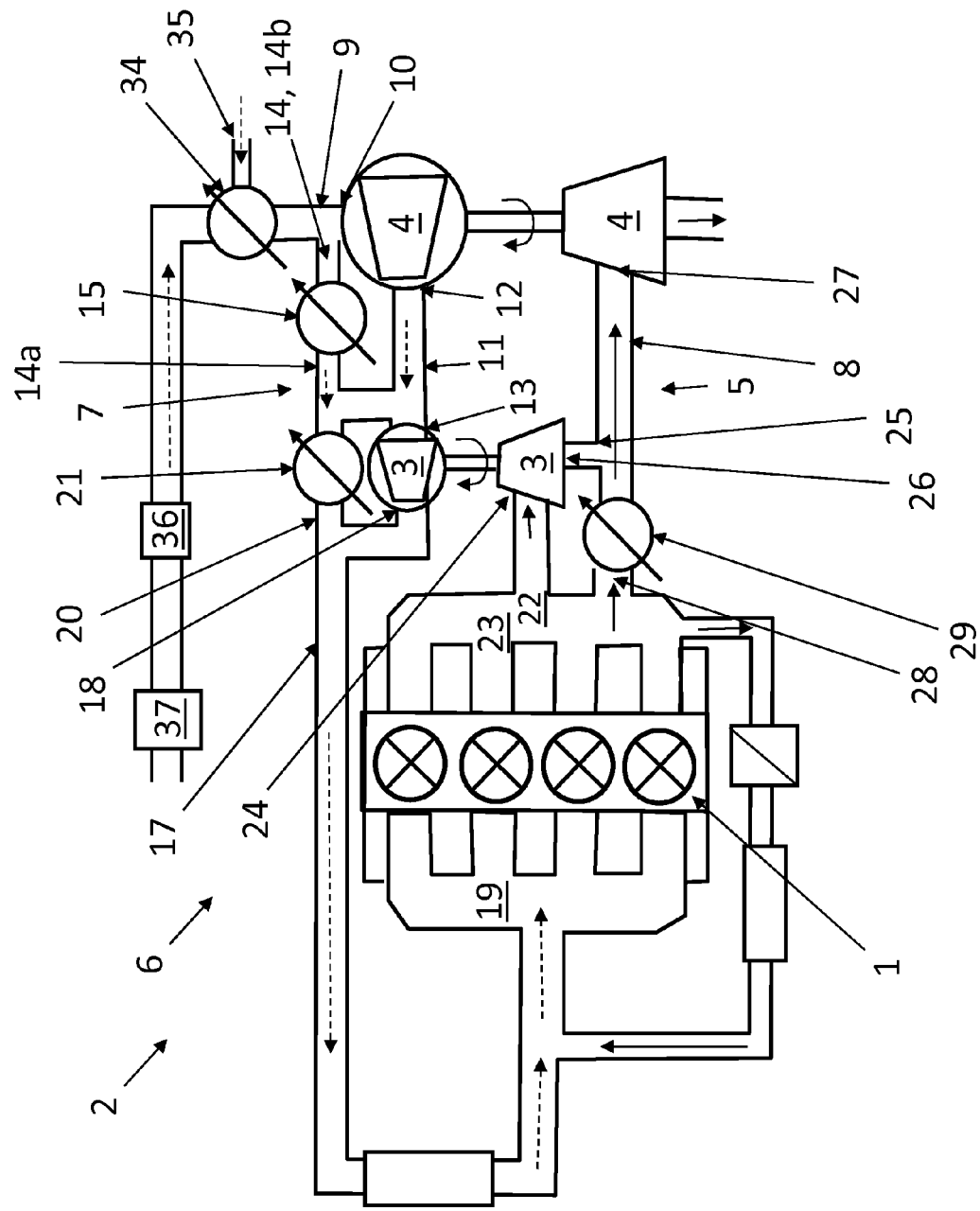
FIG. 1 schematically shows an engine with a turbocharger system according to a first example.

FIG. 1 schematically shows an engine 1 with a turbocharger system 2 according to a first example. The turbocharger system 2 comprises a high pressure turbocharger 3 and a low pressure turbocharger 4. Both the high and low pressure turbochargers 3, 4 are driven by exhaust gas on an exhaust gas side 5 of the turbochargers 3, 4. The exhaust gas flow direction is shown with fully drawn arrows. Both the high and low pressure turbochargers 3, 4 are arranged to compress air on an air intake side 6 of the turbochargers 3, 4 when exhaust gas drives the turbochargers 3, 4. The inlet air flow direction is shown with dotted drawn arrows. The high pressure turbocharger 3 is positioned upstream the low pressure turbocharger 4 with reference to the exhaust gas flow and downstream the low pressure turbocharger 4 with reference to the air flow. The turbocharger system 2 comprises a first pipe system 7 connecting the low pressure turbocharger 4 to the high pressure turborcharger 3 for fluid communication between them on the air intake side 6 and a second pipe system 8 connecting the high pressure turbocharger 3 to the low pressure turbocharger 4 for fluid communication between them on the exhaust gas side 5. The first pipe system 7 comprises a first conduit 9 connected to an inlet 10 of the low pressure turbocharger 4 and to inlet air. The first pipe system 7 comprises a second conduit 11 connecting an outlet 12 of the low pressure turbocharger 4 to an inlet 13 of the of the high pressure turbocharger 3. The first pipe system 7 comprises a first bypass conduit 14 connected to the second conduit 11 on one end and to the inlet air on the other end and a first valve 15 positioned in the first bypass conduit 14 for controlling air flow to the second conduit 11.

The first bypass conduit 14 is arranged to bypass the low pressure turbocharger 4 during predetermined events when the pressure in the second conduit 11 is lower than the pressure in the first conduit 9.

In FIG. 1 the first bypass conduit 14 is connected on one end to the second conduit 11 and on the other end connected to the first conduit 9. However, the first bypass conduit 14 could be connected on one end to the second conduit 11 and on the other end to a different pipe or pipe system connected essentially directly to ambient air. Normally the pipe system used for inlet air comprises filters and other devices that may condition the air, for example heaters and/or coolers.

According to one example, the first valve 15 is a passive valve that opens when a lower pressure is present in the second conduit 11 relative to the first conduit 9, i.e., an underpressure in the second conduit 11 compared to the first conduit 9. The first valve 15 then closes the first bypass conduit 14 when the low pressure turbocharger 4 is synchronized with the high pressure turbocharger, i.e. has revved up to a speed that eliminates the underpressure so the high pressure turbocharger 3 is provided sufficient amount of air. For example, when the engine 1 has reached a new status quo, the low pressure turbocharger 4 provides overpressure in the second conduit 11 and then helps the high pressure turbocharger 3 charging the inlet air. There are many engine modes where the low pressure turbocharger 4 creates an overpressure and there are some engine modes where the low pressure turbocharger 4 does not respond as quickly as the high pressure turbocharger 3 and then creates the underpressure in the second conduit 11. All cases will not be presented in the specification, but it should be pointed out that an advantage of using a passive first valve 15 is that such a valve will automatically create a bypass of the low pressure turbocharger when there is an underpressure, i.e., when a lower pressure is present in the second conduit 11 relative to the first conduit 9.

In FIG. 1, the first pipe system 7 comprises an air inlet pipe conduit 17 connecting an outlet 18 of the high pressure turbocharger 3 and an intake manifold 19 of the engine 1 on the air intake side 6. The first pipe system 7 comprises a second bypass conduit 20 connecting the second conduit 11 to the air inlet pipe conduit 17. The first pipe system 7 comprises a second valve 21 positioned in the second bypass conduit 20 for controlling air flow from the second conduit 11 to the air intake manifold 19. The second valve 21 is arranged to open when the pressure in the second conduit 11 is higher than in the pressure in the inlet pipe conduit 17 after the high pressure turbo charger 3 such that the high pressure turbocharger does not hinder the air flow.

In FIG. 1, the second pipe system 8 comprises an exhaust gas manifold conduit 22 connecting an exhaust gas manifold 23 of the engine 1 with an inlet 24 of the high pressure turbocharger 3. The second pipe system 8 comprises a third conduit 25 connecting an outlet 26 of the high pressure turbocharger 3 with the inlet 27 of the low pressure turbocharger 4. The second pipe system 8 comprises a third bypass conduit 28 connecting the exhaust gas manifold conduit 22 to the third conduit 25. The second pipe system 8 comprises a third valve 29 for controlling exhaust gas flow between the exhaust gas manifold conduit 22 and the third conduit 25. The third valve 29 is arranged to open when the high pressure turbocharger 3 has reached an upper limit on rotational speed or whenever to improve the efficiency of the turbocharger system 2.

With reference to the example above, should the second valve be opened also the first and/or third valve could be opened in order not to hinder the air flow. Furthermore, for all examples in FIGS. 1-3, the turbocharger system may comprise a fourth bypass (not shown) conduit bypassing the low pressure turbocharger on the exhaust gas side. An additional valve could be connected to the fourth bypass valve and the valve could be a passive or active valve connected to a control unit, similar to the first second or third valves. The fourth valve could be opened and closed in combination with the other valves in order to find the optimum usage of the system depending on the engine mode.

In FIG. 1, the first bypass conduit 14 comprises a first portion 14a connecting the second conduit 11 to the first valve 15 and a second portion 14b connecting the first valve to the first pipe system 7.

Figure 2:
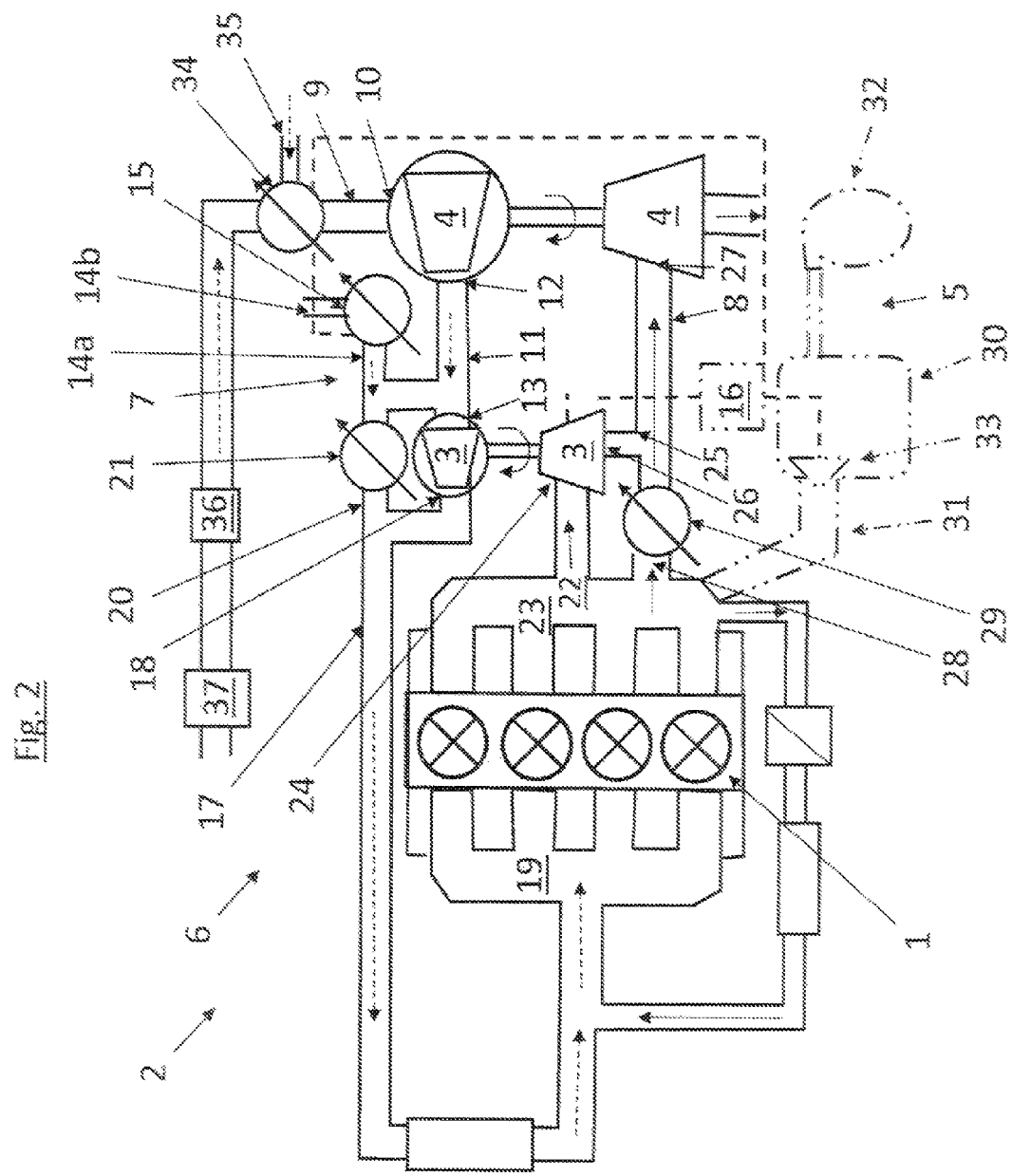
FIG. 2 schematically shows an engine with a turbocharger system according to a second example.

FIG. 2 schematically shows an engine 1 with a turbocharger system 2 according to a second example. FIG. 2 shows the same components as in FIG. 1 with exception that the first bypass conduit 14 is connected on one end to the second conduit 11 and on the other end essentially directly to ambient air. Here, the connection essentially directly to ambient air could mean a pipe system comprising devices such as filters, heaters, coolers, etc., or could mean directly in connection to ambient air. In FIG. 2, the first bypass conduit 14 comprises a first portion 14a connecting the second conduit 11 to the first valve 15 and a second portion 14b connecting the first valve essentially directly to ambient air.

Figure 3:
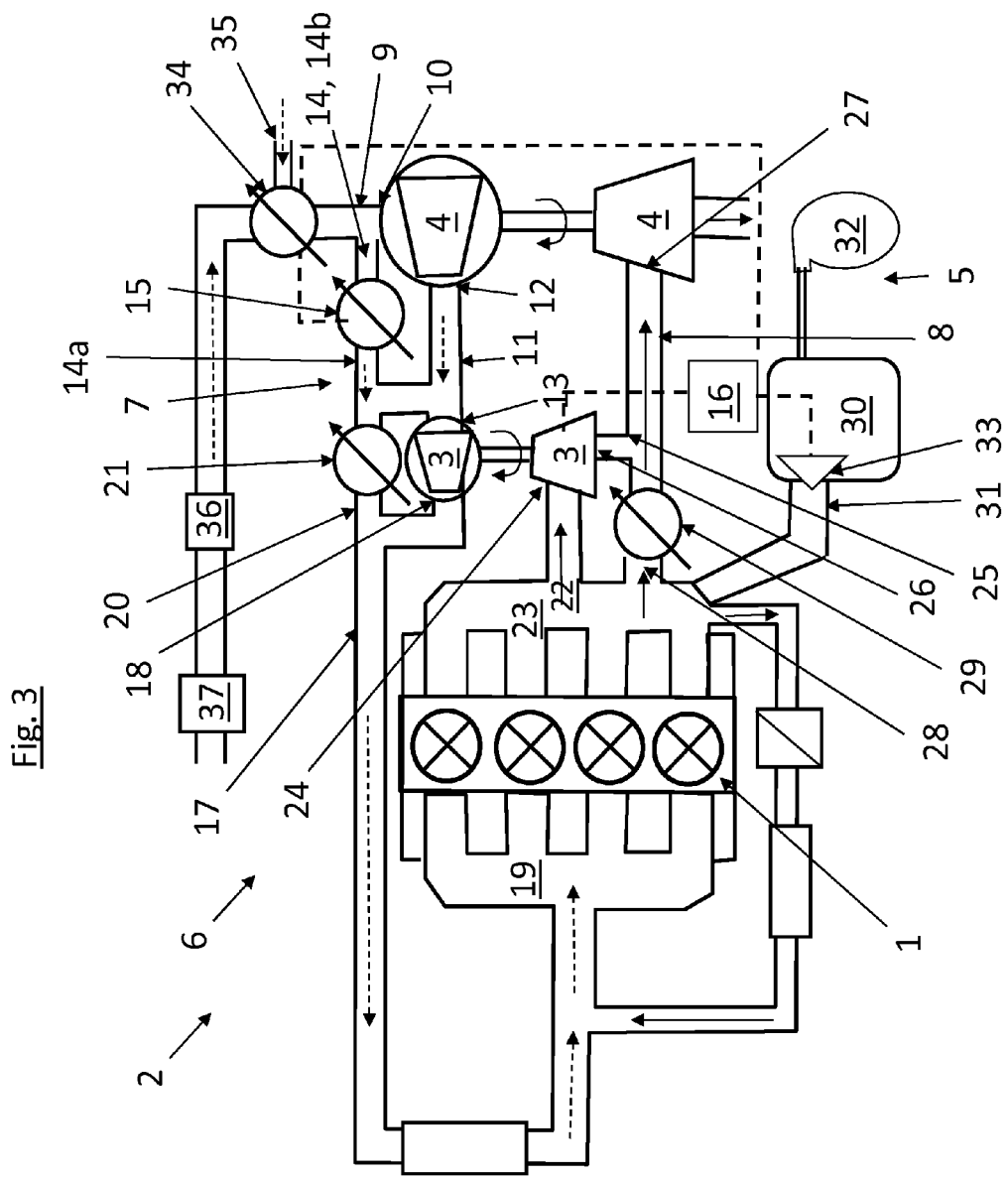
FIG. 3 schematically shows an engine with a turbocharger system according to a third example.

FIG. 3 schematically shows an engine 1 with a turbocharger system 2 according to a third example. FIG. 3 shows the same components as in FIG. 1, but the first bypass conduit could alternatively be arranged as described in FIG. 2.

In addition to FIG. 1 or 2, FIG. 3 schematically shows that the turbocharger system 2 comprises a control unit 16 and that the first valve 15 is an active valve controlled by the control unit. The control unit 16 is arranged to open the first valve 15 when a lower pressure, underpressure, in the second conduit 11 relative to the first conduit 9 is present or anticipated. Here, the control unit 16 may comprise information on specific engine modes where underpressure is present or anticipated in the second conduit. The information may be based on empiric information connected to a certain engine parameter. The information may be based on calculations made from certain engine parameters. The information may be based on information from one or more sensors in the engine or devices connected to the engine, for example, throttle, gas pedal position, rotational speed of one or both of the turbochargers, etc. One advantage of using an active valve is that the response becomes even quicker since underpressure in the second conduit can be avoided entirely since the valve does not have to be activated due to an underpressure, as with the passive valve. The first pipe system 7 may comprise a sensor (not shown) for sensing the underpressure and the sensor may advantageously be connected to the control unit 16 for supply of information.

In addition to FIG. 1 or 2, FIG. 3 schematically shows that the turbocharger system 2 comprises a tank 30 for compressed gas. The tank 30 is in fluid communication with the exhaust gas manifold conduit 22. The tank 30 is arranged to push compressed gas into the exhaust gas manifold 23 and thereby the exhaust gas manifold conduit 22 during a predetermined pulse duration time period for initial turbine and compressor spin up in the high pressure turbocharger 3.

In FIG. 3 the tank 30 is connected to and in fluid communication with the exhaust gas manifold 23 via a pipe 31. The tank 30 may however be connected directly to the exhaust gas manifold conduit via the pipe 31, or to any other part of the exhaust gas manifold system being in fluid communication with the high pressure turbocharger 3. In FIG. 3, the tank 30 is arranged to push compressed gas into the exhaust gas manifold 23 during a predetermined pulse duration time period for initial compressor spin up in the high pressure turbocharger 3. The tank 30 may be rechargeable by use of a compressor 32 for compressing air into the tank 30. The compressed gas may be air, exhaust gas or any other suitable gas.

FIG. 3 shows that the system comprises a control unit 16 connected to a pulse regulation unit for regulating the pulse duration time period.Fig. 3 also shows that the system comprises a tank valve 33 connected to the tank 30, wherein the tank valve 33 is controlled by the pulse regulation unit.

As mention above, the first bypass conduit 14 shown in Fig.3 could alternatively be arranged as described in Fig.2. To represent that embodiment, Fig. 2 shows various components of the Fig. 3 example in phantom lines, such as control unit 16, tank 30 and compressor 32. In addition, the associated control lines are shown are shown with dased lines.

With reference to FIGS. 1-3, the first pipe system 7 may comprise an inlet pipe system 7a connecting the low pressure turbocharger 3 to ambient air via filters and/or other air conditioning devices. In FIGS. 1-3, the first conduit 9 is connected to the inlet pipe system 7a, but the inlet pipe system 7a could comprise the first conduit 9. During certain engine conditions, for example high engine loads or revving of the engine, there is a need for a large amount of inlet air and the inlet pipe system 7a may then be too limiting for air supply due to for example, diameter, length, bends, filters 36, connected apparatus 37, such that underpressure becomes present in the first conduit 9 when the turbocharger(s) rev(s) up. The turbocharger system 2 may then comprise a fourth valve 34 connected between the first conduit 9 and essentially directly to ambient air. The fourth valve 34 is arranged to open essentially directly to ambient air for bypassing the inlet pipe system 7a in order to ensure sufficient flow of ambient air into the turbochargers and thus remove the underpressure in the first conduit. The fourth valve 34 may be positioned between the first conduit 9 and the first pipe system 7a, as seen in FIGS. 1-3. The fourth valve 34 is then also connected essentially directly to ambient air, for example via an air tube 35 and the fourth valve 34 can switch between the ambient air 35 and the inlet pipe system 7a. As an alternative the fourth valve 34 may open essentially directly to ambient air without closing off the inlet pipe system 7a, i.e., while allowing air flow from the inlet pipe system 7a to the first conduit 9. As yet an alternative, (not shown) the inlet pipe system 7a and/or the first conduit 9 may be connected to an air tube 35 connected essentially directly to ambient in order to avoid the underpressure in the first conduit 9 during said engine conditions. The fourth valve may then be arranged in the air tube as a switch on and switch off valve for opening and closing the air flow in the air tube. In all examples, the fourth valve may be controlled by the control unit 16 or by a separate control unit, each having engine status information. The fourth valve may also be a passive valve that opens when there is an underpressure in the first conduit. The bypassing of the inlet pipe system could be made during bypassing of the low pressure turbocharger by the second bypass conduit should there otherwise be an underpressure in the first conduit. The bypass of the inlet pipe according to the above may be done in combination to the first bypass conduit being connected essentially directly to ambient air without being connected to the first conduit, as described in FIG. 2. Also here, the advantage is that both the first conduit and the second conduit then are connected to an air source, ambient air, that has essentially the same pressure. As stated before, this advantage is also present should the first bypass conduit be connected to the first conduit according to FIGS. 1 and 3. The arrangement(s) described would be advantageous also during a push of the pressurized gas in the tank into the exhaust manifold according to FIG. 3 since no underpressure in the system would hinder the revving up of the high pressure turbocharger.

It should be noted that "essentially directly to ambient air" means that no or very little pressure loss is experienced in the conduit connected to the ambient air.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A turbocharger system for a vehicle, the turbocharger system comprising:
   a high pressure turbocharger and a low pressure turbocharger, both the high and low pressure turbochargers being drivable by exhaust gas on an exhaust side of the high and low pressure turbochargers, both the high and low pressure turbochargers being arrangeable to compress air on an air intake side of the high and low pressure turbochargers when exhaust gas drives the high and low pressure turbochargers, the high pressure turbocharger being positioned upstream of the low pressure turbocharger with reference to exhaust gas flow and downstream of the low pressure turbocharger with reference to air flow;
   an exhaust gas manifold in fluid communication with an exhaust gas manifold conduit;
   a tank in fluid communication with the exhaust gas manifold, wherein the tank is arranged to push compressed gas as a pulse into the exhaust manifold during a predetermined pulse duration time period for initial compressor spin up in the high pressure turbocharger;
   a control unit connected to a pulse regulation unit for regulating the pulse duration time period;
   a tank valve connected to the tank, wherein the tank valve is controllable by the pulse regulation unit;
   a first pipe system connecting the low pressure turbocharger to the high pressure turbocharger for fluid communication between the high and low pressure turbochargers on the air intake side, the first pipe system comprising a first conduit connected to an inlet of the low pressure turbocharger and to inlet air, a second conduit connecting an outlet of the low pressure turbocharger to an inlet of the high pressure turbocharger, a first bypass conduit connected to the second conduit on one end and essentially directly to ambient air on another end, and a first valve positioned in the first bypass conduit arranged to open to allow air flow essentially directly from ambient air to the second conduit, wherein the first valve is configured to be opened in combination with the pulse to avoid underpressure in the second conduit; and a second pipe system connecting the high pressure turbocharger to the low pressure turbocharger for fluid communication between the high and low pressure turbochargers on the exhaust gas side.

2. The turbocharger system according to claim 1 wherein the first bypass conduit is connected to the first conduit on the other end, and wherein the first conduit is connected essentially directly to ambient air.

3. The turbocharger system according to claim 1 wherein the first valve is a passive valve that is configured to open when the pressure in the second conduit is lower than the pressure in the first conduit.

4. The turbocharger system according to claim 1 wherein the first valve is an active valve controllable by the control unit, and wherein the control unit is configured to open the first valve when a lower pressure in the second conduit relative to the first conduit is present or anticipated.

5. The turbocharger system according to claim 1 wherein the first pipe system comprises an air inlet pipe conduit connecting an outlet of the high pressure turbocharger and an intake manifold of an engine on the air intake side, a second bypass conduit connecting the second conduit to the intake manifold, and the second valve positioned in the second bypass conduit for the controlling air flow from the second conduit to the air intake manifold, and wherein the second valve is configured to open when the pressure in the second conduit is higher than pressure in the inlet pipe conduit after the higher pressure turbo charger.

6. The turbocharger system according to claim 1 wherein the second pipe system comprises the exhaust gas manifold conduit connecting the exhaust gas manifold with an inlet of the high pressure turbocharger, a third conduit connecting an outlet of the high pressure turbocharger with an inlet of the low pressure turbocharger, a third bypass conduit connecting the exhaust gas manifold conduit to the third conduit, and a third valve for controlling exhaust gas flow between the exhaust gas manifold conduit and the third conduit, the third valve being configured to open when the high pressure turbocharger has reached an upper limit on rotational speed or whenever to improve the efficiency of the turbocharger system.

7. A method for controlling a turbocharger system for a vehicle, wherein the turbocharger system comprises a high pressure turbocharger and a low pressure turbocharger, both the high and low pressure turbochargers being drivable by exhaust gas on an exhaust side of the high and low pressure turbochargers, both the high and low pressure turbochargers being arranged to compress air on an air intake side of the high and low pressure turbochargers when exhaust gas drives the high and low pressure turbochargers, the high pressure turbocharger being positioned upstream of the low pressure turbocharger with reference to exhaust gas flow and downstream of the low pressure turbocharger with reference to air flow, wherein the turbocharger system further comprises a first pipe system connecting the low pressure turbocharger to the high pressure turbocharger for fluid communication between the high and low pressure turbochargers on the air intake side and a second pipe system connecting the high pressure turbocharger to the low pressure turbocharger for fluid communication between the high and low pressure turbochargers on the exhaust gas side, the first pipe system comprising a first conduit connected to an inlet of the low pressure turbocharger and to inlet air, a second conduit connecting an outlet of the low pressure turbocharger to an inlet of the of the high pressure turbocharger, a first bypass conduit connected to the second conduit on one end and essentially directly to ambient air on another end, and a first valve positioned in the first bypass conduit, and wherein the turbocharger system further comprises an exhaust gas manifold in fluid communication with an exhaust gas manifold conduit, a tank in fluid communication with the exhaust gas manifold, a tank valve connected to the tank, and a control unit connected to a pulse regulation unit, the method comprising:

controlling the tank valve by the pulse regulation unit;

pushing, by the tank, compressed gas as a pulse into the exhaust manifold during a predetermined pulse duration time period for initial compressor spin up in the high pressure turbocharger, wherein the control unit is configured to regulate the pulse duration time period; and combining the pulse with opening of the first valve to avoid underpressure in the second conduit.

8. The method according to claim 7 wherein the first bypass conduit is connected to the first conduit on the other end, and wherein the first conduit is connected essentially directly to ambient air.

9. The method according to claim 7 wherein the first valve is a passive valve that opens when the pressure in the second conduit is lower than the pressure in the first conduit.

10. The method according to claim 7 wherein the first valve is an active valve controlled by the control unit, and wherein the method further comprises opening the first valve, by the control unit, when a lower pressure in the second conduit relative to the first conduit is present or anticipated.

11. The method according to claim 10 wherein the first bypass conduit is connected to the first conduit on the other end, and wherein the first conduit is connected essentially directly to ambient air.

* * * * *